United States Patent
Pontes Bittencourt

(10) Patent No.: US 12,017,915 B2
(45) Date of Patent: Jun. 25, 2024

(54) CATALYSTS, PROCESSES FOR OBTAINING AND PROCESSES FOR STEAM REFORMING

(71) Applicant: PETROLEO BRASILEIRO S.A.—PETROBRAS, Rio de Janeiro (BR)

(72) Inventor: Roberto Carlos Pontes Bittencourt, Rio de Janeiro (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 163 days.

(21) Appl. No.: 17/399,448

(22) Filed: Aug. 11, 2021

(65) Prior Publication Data
US 2022/0055894 A1 Feb. 24, 2022

(30) Foreign Application Priority Data

Aug. 20, 2020 (BR) .......................... 1020200169742

(51) Int. Cl.
| | |
|---|---|
| C01B 3/40 | (2006.01) |
| B01J 21/04 | (2006.01) |
| B01J 23/00 | (2006.01) |
| B01J 23/755 | (2006.01) |
| B01J 23/83 | (2006.01) |
| B01J 35/61 | (2024.01) |
| B01J 37/02 | (2006.01) |
| B01J 37/04 | (2006.01) |
| B01J 37/08 | (2006.01) |
| B01J 37/18 | (2006.01) |

(52) U.S. Cl.
CPC .............. *C01B 3/40* (2013.01); *B01J 21/04* (2013.01); *B01J 23/002* (2013.01); *B01J 23/755* (2013.01); *B01J 23/83* (2013.01); *B01J 35/612* (2024.01); *B01J 35/613* (2024.01); *B01J 37/0213* (2013.01); *B01J 37/04* (2013.01); *B01J 37/082* (2013.01); *B01J 37/18* (2013.01); *C01B 2203/0233* (2013.01); *C01B 2203/1058* (2013.01); *C01B 2203/1076* (2013.01); *C01B 2203/1241* (2013.01)

(58) Field of Classification Search
None
See application file for complete search history.

(56) References Cited

U.S. PATENT DOCUMENTS

2013/0085062 A1* 4/2013 Ferrandon ............ C01G 37/006
502/328

* cited by examiner

*Primary Examiner* — Colin W. Slifka
(74) *Attorney, Agent, or Firm* — RAPHAEL BELLUM PLLC

(57) ABSTRACT

The present invention refers to processes for obtaining steam reforming catalysts containing nickel, cerium, lanthanum and copper oxides, free from potassium or alkali metals, preferably with the oxide layer being located externally with a thickness of less than 0.5 mm on the support particle, preferably the support being based on alumina, magnesium aluminate, hexaaluminates or mixtures thereof. The catalysts according to present invention show high activity, resistance to thermal deactivation and resistance to coke accumulation in the steam reforming reaction of hydrocarbons.

19 Claims, 6 Drawing Sheets

CATALYSTS, PROCESSES FOR OBTAINING AND PROCESSES FOR STEAM REFORMING

FIELD OF INVENTION

The present invention refers to processes for obtaining steam reforming catalysts containing nickel, cerium, lanthanum and copper oxides, free from potassium or alkali metals with application in the area of hydrorefining, aiming at catalysts having high activity, resistance to thermal deactivation and resistance to accumulation of coke in the steam reforming reaction of hydrocarbons.

DESCRIPTION OF PRIOR ART

Hydrogen is used on a large scale in the oil refining industry for the purpose of removing contaminants such as sulfur compounds, nitrogenate, oxygenate and aromatic compounds present in petroleum derivatives such as gasoline, diesel, gasoil and vacuum waste. Hydrogen is also used on a large scale in industrial processes for producing ammonia and in various hydrogenation processes. The mixture of hydrogen and carbon monoxide is known as synthesis gas and is used on a large scale for the production of methanol and synthetic fuels. Currently, hydrogen and synthesis gas are produced on an industrial scale, mainly through the process called steam reforming.

In the steam reforming process, the reaction between hydrocarbons and water vapor occurs, at typical temperatures of 450° C. to 550° C. at the reactor inlet, 750° C. to 950° C. at the reactor outlet and pressures between 10 kgf/cm² to 40 kgf/cm² in contact with a nickel-based catalyst deposited on refractory supports, such as alpha-alumina, magnesium aluminate, calcium aluminate, or mixtures thereof.

Hydrocarbons industrially used in steam reforming units with a capacity above 100,000 Nm³/day of hydrogen can be: natural gas, refinery gases, propane, butanes, liquefied petroleum gas (GLP) and light naphtha.

Considering methane as an example, the main reactions that take place during the steam reforming process can be represented by the equations below, which together have a highly endothermic energy balance, since the reforming reaction (1) consumes 206.4 kJ/mol while the shift reaction (2) releases only 41.2 kJ/mol:

$$CH_4 + H_2O = CO + 3H_2 \qquad (1) \text{ reforming reaction}$$

$$CO + H_2O = CO_2 + H_2 \qquad (2) \text{ shift reaction}$$

The steam is injected together with the hydrocarbon load in a variable number of metallic tubes made of complex metal alloys, with typical dimensions ranging between 7 cm and 15 cm in external diameter and height that can vary between 10 m and 13 m, and in whose interior are the nickel-based steam reforming catalysts on refractory supports. The tubes (or reactors) are located inside a heating oven, which supplies the heat needed for the reactions. The assembly comprising of the tubes and the heating oven is called the primary reformer.

The tubes (or reactors) of the reformer are designed to have a service life around 100,000 hours of operation at design temperature conditions, typically between 900° C. to 970° C., considered to be the maximum temperature to be reached in the tube wall. The life of the tubes, however, is severely reduced if this temperature exceeds the design value. In addition to the high cost of replacing the tubes, there is a risk of mechanical failure in operation if there are regions in the tubes with temperature values above the design temperature, referred to in industrial practice as spots and/or hot regions.

One of the well-known causes for the appearance of hot spots or regions in the reformer tubes is the low catalyst activity. In addition to reducing the life of the tubes, a high temperature on the tube wall can cause reduction of the capacity of the unit and/or the need for stoppage thereof to replace the catalyst, these alternatives are to reduce the risk of rupture of the tubes in operation.

It is well known that among the main problems that lead to the reduction of the activity of the nickel-based catalyst on refractory supports, such as alumina, magnesium or calcium aluminates, carbon deposition stands out, which in a generic way can be called coke, especially when processing raw materials with a greater tendency to form coke, such as naphtha or heavy natural gas containing significant amounts of higher molecular weight hydrocarbons or fillers with the presence of olefins.

The main reactions that lead to coke formation are presented below:

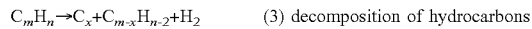

$$C_mH_n \rightarrow C_x + C_{m-x}H_{n-2} + H_2 \qquad (3) \text{ decomposition of hydrocarbons}$$

$$2CO \rightarrow C + CO_2 \qquad (4) \text{ reaction of Boudouard}$$

The accumulation of coke on the steam reforming catalyst leads to a reduction in its activity, which can lead to increased hydrogen production costs, reduced production capacity and, in more severe cases, the shutdown of the unit, in order to minimize the risk of reactor failures (reformer tubes) occurring due to exposure to high temperatures due to low catalyst activity.

In industrial practice, some techniques are well known to prevent the accumulation of coke on steam reforming catalysts, such as: a) using a large excess of steam in relation to the stoichiometry of the reforming (1) and shift (2) reactions, usually quantified by the parameter referred to as vapor/carbon ratio (mol/mol). This solution is suitable when the hydrocarbon used in the process is a light natural gas, so called, as it contains a low content of high molecular weight hydrocarbons. Typical values for the vapor/carbon ratio using light natural gas are in the range between 2.8 mol/mol to 4 mol/mol. This solution, however, causes a high energy consumption in the process and, consequently, an increase in hydrogen production costs, in addition to an increase in $CO_2$ emissions in the process. Such a solution is still insufficient when using fillers with a high tendency to deposition of coke, such as fillers containing aromatic compounds; b) for natural gas having a high content of higher molecular weight hydrocarbons, propane, butanes or naphtha, commonly called heavy loads, of which naphtha is the typical example, a large excess of steam is used, typically a steam/carbon ratio comprised between 3.0 to 5.0 mol/mol associated with the use of catalysts containing alkali metal promoters, particularly potassium.

The use of alkali metals, especially potassium, in the formulation of steam reforming catalysts to prevent coke deposition is also well known in the literature. The addition of potassium in the formulation of steam reforming catalysts has the inconvenience of reducing the activity of converting hydrocarbons into synthesis gas and/or hydrogen.

A second disadvantage of using potassium as a promoter of steam reforming catalysts to reduce coke build-up is the occurrence of release of this element from the catalyst during the campaign, due to severe reaction conditions, particularly due to the presence of steam and high temperatures. Such potassium loss can cause reduction of catalyst's life and lead to corrosion problems in the unit, which requires the use of noble construction materials. As an example, when a failure occurs in a bypass line of a section of a hydrogen generating unit caused by caustic corrosion from the potassium released from the steam reforming catalysts.

Document U.S. Pat. No. 3,271,325 aims to reduce the formation of coke in the steam reforming process, providing in the catalyst composition the presence of alkali or alkaline earth metals, in a metal oxide content equivalent to at least 0.5% w/w of $K_2O$ and not more than 11% w/w pf $K_2O$. Conveniently, the alkali or alkaline earth metal compound is present in the catalyst in oxide form or is transformed into oxide under industrial conditions of activation of the steam reforming catalyst.

Preferred compounds for introducing the alkaline compound into the formulation of steam reforming catalysts would be hydroxides and carbonates. However, nitrates and bicarbonates can also be used. Preferably, the alkali metal used is potassium or sodium, considering criteria of cost and efficiency of the promoter's effect.

The beneficial effect in reducing the problems associated with coke formation with the introduction of potassium in the formulation of steam reforming catalysts has been confirmed in the literature by numerous studies, which seek to identify the mechanisms of this beneficial action. Still, it is desirable to incorporate alkali metals, especially potassium, in the formulation of steam reforming catalysts in order to reduce coke deposition rates, the literature also teaches that there are some disadvantages that end up making evident the need for its elimination of catalyst formulation.

The main disadvantage of the addition of alkali metals in the formulation of steam reforming catalysts refers to the reduction of the reaction activity. Document U.S. Pat. No. 3,391,089 teaches the use of selected promoters from the alkali metal group, at levels of 0.25% w/w to 0.95% w/w, in the preparation of NiO-type steam reforming catalysts on refractory supports, to reduce the deposition of coke during the steam reforming of heavy hydrocarbons such as naphtha. However, there is a marked loss of steam reforming activity, and the order of reduction observed being higher for lithium and lower for cesium: lithium>potassium>sodium>cesium.

In the published article by HADDEN, R. A.; HOWE, J. C., WAUGH, K. C, "Hydrocarbon steam reforming catalysts—formation", *Catalyst Deactivation, v.* 68, p. 177-184, 1991, shows that the addition of 5.7% w/w of potassium through the impregnation of a catalyst containing 10% of Ni supported on alpha-alumina with potassium hydroxide solution, followed by drying at 100° C. for 16 hours, leads to a reduction in the accumulation of coke deposits on the surface of the catalyst of the steam reforming reaction.

The reference GOLEBIOWSKI, A. et al. "Influence of potassium on the properties of steam reforming catalysts", Reaction Kinetics Catallysis Letters, v. 82, n. 1, p. 179-189, 2004, confirms that the addition of $K_2O$ over a Ni/supported catalyst decreases the formation of coke, showing results that confirm the unfavorable aspect of the introduction of potassium in reducing the catalyst's activity.

Literature and industrial practice also teach that the effect of activity reduction by the introduction of alkali metals causes a higher temperature in the wall of the tubes (reactors) of the reformer. This situation has a negative impact on increasing the risk of tube rupture or even reducing the unit's hydrogen or synthesis gas production capacity, as a measure to keep the tube wall temperature below the design value.

There are also some techniques to minimize the negative effects of using potassium in steam reforming catalyst formulations. Document U.S. Pat. No. 4,250,060 teaches that the increase in the operating temperature in the reformer can cause another undesirable effect, which is the loss of catalyst activity by sintering the metallic nickel active phase, a mechanism that is favored by the increase in the reaction temperature. In this way, what is proposed is the elimination of potassium or sodium content or its limited use up to a maximum content of 0.43% m/m of potassium and 0.1% m/m of sodium, in the preparation of a catalyst for gasification of heavy loads by a steam reforming process. Thus, the alkali metal contents chosen would allow to obtain a good resistance to coke deposition, without a significant loss of catalyst stability due to sintering of the metallic nickel active phase.

Document PI1000656-7 teaches a method of preparing nickel-type steam reforming catalysts supported on magnesium aluminates, calcium aluminates or hexa-aluminates with the incorporation of an alkaline promoter in the crystal structure of the support, in order to obtain a catalyst with high activity compared to prior art, but with less effect of reducing catalyst activity.

Document U.S. Pat. No. 4,060,498 teaches that a second disadvantage in the use of potassium as a promoter of steam reforming catalysts is related to the release of this component during the operation of the unit, favored by the presence of steam and high temperatures. The released potassium condenses in lower temperature sections in the unit, leading to the risk of line clogging with a consequent reduction in thermal efficiency. The release of potassium from the steam reforming catalyst can also cause serious corrosion problems in the unit, in which there is a breakdown in line operation in a hydrogen production unit by steam reforming, caused by stress corrosion by the presence of caustic material, consisting of potassium hydroxide released from the steam reforming catalyst.

U.S. Pat. No. 3,759,678 teaches the preparation of a steam reforming catalyst with sodium and potassium contents of less than 30 ppm as a means of avoiding problems associated with the formation of deposits in the steam generation system of a hydrogen production unit. This solution, however, does not provide protection against coke deposition on the catalyst, when using heavy loads in the production of hydrogen by steam reforming. Potassium released from the steam reforming catalyst can further reduce the performance of catalysts downstream of the reformer, such as the HTS (high temperature shift) or MTS (medium temperature shift) catalyst. Evaporation of potassium compounds from the surface of the steam reforming catalyst is favored by the low melting point of the KOH compound which is introduced in this form or is formed under industrial operating conditions from other potassium compounds added to the catalyst formulation.

Given the disclosed problems of using potassium in steam reforming catalyst formulations, the use of alternative promoters to reduce coke buildup has been investigated.

Thus, another alternative has been studied, wherein the use of a second noble metal in the formulation of supported nickel-type catalysts for the production of hydrogen and/or synthesis gas, or even the complete replacement of nickel by noble metals.

Patent EP1338335 refers to a steam reforming catalyst consisting of cobalt or nickel, in a content between 0.1% to 20% m/m, a component selected from the group Pt, Pd, Ru, Rh and Ir in a content between 0.1% to 8% m/m, on a support comprised of alumina oxide and cerium oxide.

Document U.S. Pat. No. 7,309,480 discloses a steam reforming catalyst consisting of at least one active metal, selected from the group of Pt, Pd or Ir on a support.

The reference U.S. Pat. No. 4,998,661 discloses a steam reforming catalyst containing at least one metal oxide selected from nickel oxide, cobalt oxide or platinum oxide on supports composed of alumina and oxides selected from the group of Ca, Ba or Sr.

U.S. Pat. No. 4,060,498 describes the use of silver, in a content of at least 2 mg per 100 grams of nickel-based catalyst, as a promoter to reduce the formation of coke. This solution, however, has the inconvenience of the high cost of noble metals as well as their low availability as a natural resource to be used on a large scale in hydrogen production processes.

Studies also teach the use of several other promoters for nickel-based steam reforming catalysts on refractory supports in order to reduce the coke content.

Document U.S. Pat. No. 5,599,517 teaches the use of a metal selected from the group consisting of Ge, Sn, and Pb, with a content between 1% to 5%; 0.5% to 3.5% and 0.5% to 1% (m/m), respectively, in a nickel-based catalyst, as a promoter to reduce coke formation. This solution, however, exhibits additional problems related to the handling, use and disposal of the catalyst, such as the use of heavy metals such as lead, or they are not efficient for protection against the accumulation of coke, of heavy loads, especially those containing olefins.

Another promoter taught in the literature by BOROWIECKI, T.; GOLEBIOWSKI, A. "Influence of molybdenum and tungsten additives on the properties of nickel steam reforming catalysts", *Catalysis Letters*, v. 25, p. 209-313, 1994, is molybdenum, where the addition of 0.2 to 5% m/m of $MoO_3$ by the impregnation technique of NiO/alpha-alumina catalysts reduces the coking rate in the steam reforming reaction of the butane, without a significant reduction in catalytic activity, but discloses a significant reduction in steam reforming activity. One of the explanations for this apparent contradiction is that reaction conditions affect the behavior of molybdenum as a promoter.

In another study by BOROWIECKI, T.; GIECKO, G.; PANCZYK, M. "Effects of small $MoO_3$ additions on the properties of nickel catalysts for the steam reforming of hydrocarbons II. Ni—Mo/$Al_2O_3$ catalysts in reforming, hydrogenolysis and cracking of n-butane", *Applied Catalysis A: General*, v. 230, p. 85-97, 2002, it was found that molybdenum also vaporizes under reaction conditions, thus not being a satisfactory solution for replacing potassium as a promoter.

Thus, it is desirable to use a promoter in the Ni catalyst/support to reduce the deposition of coke to replace potassium, but which does not have a high cost as the noble metals and does not have problems observed for potassium in vaporization under conditions reaction, such as molybdenum. A candidate of interest considering its low cost and high availability would be copper.

Copper used as a promoter of Ni-type catalysts/support to increase carbon deposition in methane to coke and hydrogen decomposition reactions (reaction 5), is the opposite effect to the desired effect in the steam reforming reactions. Studies by RESHETENKO, T. et al., "Carbon capacious Ni—Cu—$Al_2O_3$ catalysts for high temperature methane decomposition", *Applied Catalysts, A: General*, v. 247, p. 51-63, 2003, showed that Cu—Ni/alumina-type catalysts allow the accumulation of more coke on the catalyst than Ni/alumina-type catalysts and that small copper contents promote increased carbon deposition on a Ni/Cu/$SiO_2$.

$$CH_4 \leftrightarrow C+H_2 \qquad \text{(5) methane decomposition reaction}$$

Another reaction that the literature teaches is the use of Ni/support catalysts promoted by copper, referred to as dry reforming of methane, exemplified by reaction (6). In this reaction, the effect of copper in reducing the deactivation of Ni/silica catalysts was explained as retarding the sintering of the metallic nickel phase and reducing the formation of a type of coke referred to as an encapsulant, as referenced by CHEN, H. W. et el., "Carbon dioxide reforming of methane reaction catalyzed by stable nickel cooper catalysts", *Catalysis Today*, v. 97 (2-3), p. 173-180, 2004. The effect is apparently dependent on the copper content added to the catalyst, since the 5% w/w copper content in a Ni/alumina catalyst promotes the undesired effect of increasing coke build-up, as taught in LEE, J. H. et al., "Stabilization of Ni/$Al_2O_3$ catalysts by cu addition for $CO_2$ reforming of methane", *Applied Catalysis A: General*, v. 269 (1-2), 2004.

$$CH_4+CO_2 \leftrightarrow 2CO+2H_2 \qquad \text{(6) methane dry reforming reaction}$$

It is known that copper contemplates the beneficial use as a promoter in formulations of steam reforming catalysts for alcohols such as methanol, ethanol and glycerol. Examples of these teachings are AMPHLETT, J. C. et al., "Hydrogen production by the catalytic steam reforming of methanol: Part 2: Kinetics of methanol decomposition using girdler G66B catalysts", *The Canadian Journal of Chemical Engineering*, v. 63, p. 605-611, 1985 e MARINO, F. J. et al., "Hydrogen from steam reforming of ethanol. Characterization and performance of cooper-nickel supported catalysts", *International Journal of Hydrogen Energy*, vol. 23, p. 1095-1101,1998, which disclose the use of a commercial catalyst of the CuO/ZnO type for the steam reforming of methanol. In this use, the reaction is conducted at moderate temperatures in the order of 300° C. to 400° C. and large excess steam and sometimes focused on other aspects such as activity and selectivity instead of coke accumulation, which are inadequate conditions for the steam reforming of charges that is typically carried out at temperatures around 500° C. at the entrance of the reformer tubes and from 850° C. to 950° C. at the exit of these tubes (reactors). The lessons obtained by the use of copper as a promoter of nickel catalysts in the steam reforming of alcohols, therefore, cannot be extended to the steam reforming of natural gas, propane, butane or naphtha, due to the different temperature conditions, of the reactivity of the hydrocarbons and their different tendencies to coke accumulation.

There are few teachings on the use of copper in Ni/support catalysts for the steam reforming of hydrocarbons selected from natural gas, propane, butane or naphtha or mixtures thereof and the results are contradictory. It is known that Cu—Ni alloys exhibit in the methane steam reforming reaction the same rate of carbon formation and gasification as monometallic Ni, when supported on silica, except when the copper content is high in the alloys (80% Cu). These alloys form a new type of coke with fine filaments, as taught in the study by BERNADO, C. A.; ALSTRUP, I.; ROSTRUP-NIELSEN, J. R., "Carbon deposition and methane steam reforming on silica-supported nickel-copper catalysts", *Journal of catalysis*, v. 96 (2), p. 517-534, 1985.

The use of silica as a support for steam reforming catalysts can be considered difficult to use in practice, since silica presents volatility in the presence of steam, which can lead to problems of catalyst embrittlement and/or deposition in equipment downstream of the reformer. In the steam reforming of shale gas, the catalytic activity of Ni—Cu/alumina catalysts prepared by the impregnation method is superior to catalysts of the same composition prepared by the coprecipitation method, according to the reference JABARULLAH, N. H.; OTHMAN, R., "Steam reforming of shale gas over alumina supported Ni—Cu nano-catalysts", *Petroleum Science and Technology*, v. 37 (4), 2019. This teaching shows us how the catalyst production process can affect its properties, not only its composition being a determining factor.

Patent CA2130953 discloses a process for steam reforming carbonaceous loads containing nitrogen with reduced formation of ammonia over a catalyst containing 0.01% to 10% w/w of copper calculated on the nickel content present in the catalyst, in which nothing is mentions about the tendency of coke accumulation.

The results of studies show that the use of copper can cause increased coke formation in the decomposition reaction or in the dry reforming of methane is dependent on the catalyst preparation process for steam reforming reactions of methane. Thus, despite the existence of teachings on the use of NiCu/support formulations for the steam reforming of hydrocarbons, there is still a need for an efficient method of preparing a steam reforming catalyst that uses copper to replace potassium that proves to be effective to reduce coke buildup, preferably maintaining a higher steam reforming activity than prepared materials.

Steam reforming catalysts are typically prepared by impregnation methods of a metallic nickel salt, preferably nitrate in aqueous solution and may contain other salts as promoter precursors, on a refractory support, followed by drying and calcination to obtain a phase of supported nickel oxide which may contain promoters. The catalyst thus prepared is typically activated under industrial conditions using a gas containing hydrogen, ammonia, methanol or natural gas in large excess of steam, to obtain the active phase of metallic nickel. In this method, the nickel oxide phase and promoters are distributed inside the support particles, which typically have typical dimensions of 2 to 4 cm in diameter and/or length, and can be catalyst particles of different shapes, such as of cylinder or spheres with a single hole or with multiple holes, having its outer surface smooth or wavy. However, it is known that steam reforming reactions at high temperatures, such as those used for steam reforming natural gas, propane, butane and naphtha, are diffusionally limited, which in practice causes the active material inside the particles catalyst not to be used.

There are also methods for preparing eggshell catalysts applicable to the steam reforming reaction. U.S. Pat. No. 9,511,351 discloses a method of dispersing a suspension containing one or more active metal compounds selected from the group consisting of Ni, Cu, Pt, Pd, Rh, Ru and Au onto a surface of a preformed support, followed by drying and calcination. The suspension may contain oxides, hydroxides or carbonates, which may have previously been produced by co-precipitation. Particularly, the catalyst support comprises alumina and/or stabilized alumina, such as those containing lanthanum or zirconia. However, this method is of limited use to control the thickness of the active phase layer on the support or to the use of metal nitrate salts. Results from the use of Ni and Cu mixtures are also not presented, in particular the use of copper as a promoter to increase the resistance to the accumulation of coke is not presented or taught.

U.S. Pat. No. 9,393,552 teaches an eggshell-type catalyst comprised of a metal alloy of nickel and iridium or ruthenium as an active phase on a support of alumina, zirconia, magnesia, titania type or a mixture thereof. The catalyst has application in the autothermal reforming reaction, that is, in the presence of oxygen or air. The catalyst is preferably prepared by first introducing the nickel homogeneously into the support through impregnation, drying and calcination steps. Subsequently, on the nickel catalyst, the impregnation is carried out with an aqueous solution of iridium salt ($IrCl_3 \cdot H_2O$ or iridium acetate) or ruthenium ($Ru(NO_3)_3NO$ or $RuCl_3 \cdot nH_2O$) followed by drying, calcining and reduction steps, in order to obtain a distribution of noble metal of eggshell-type. Thus, the occurrence of the eggshell distribution occurs due to the interaction of specific anions, such as $IrCl_6^{3-}$ in aqueous solution with positive charges of the alumina surface, such as $Al^-(OH_2)^+$ or other basic species on the support.

U.S. Pat. No. 8,716,170 discloses a method of preparing eggshell catalysts comprising the steps of first adsorbing and then removing part of a non-polar solvent on the support, adsorbing a polar solvent on the particle so as to have a biphasic particle, with the non-polar solvent on the interior and the polar solvent on the outermost region of the support particle. Next, the particle is contacted with a solution of a metal salt in a polar solvent and the pH adjusted by adding a non-aqueous base to nucleate the metal precursor particles. Afterwards, the drying and calcination steps follow. The non-polar solvents include C7 to C10 hydrocarbons and as polar solvents ethanol or other alcohols. In the example, n-heptane is used as a non-polar solvent, ethanol is a polar solvent and urea is used as a base to prepare a Co/silica catalyst for use in Fischer-Tropsch processes. It is observed that this method is not widely applicable, as it depends on the interaction properties of the support with salt precipitated by the addition of a non-aqueous solution of a base to adjust the pH.

Thus, there is still a need to provide a method of preparation of eggshell catalysts of the type of Ni/support promoted by copper and rare earths that allows the control of the thickness of the active layer and which catalyst thus obtained can be applied to the steam reforming process for production of hydrogen or synthesis gas, providing an increase in resistance to the accumulation of coke, lower production costs and less emission of contaminants, such as $CO_2$ in the production process.

Document GB1571865 discloses a nickel based steam reforming catalyst supported on a refractory material such as calcium aluminate. More specifically, the catalyst is potassium-free and useful in the steam reforming process of heavy hydrocarbons in which the high activity of the catalyst has long durability but does not use lanthanum and cerium oxides in its formulation, in addition to not containing copper as a promoter despite the existence of teachings on the use of NiCu/support formulations for the steam reforming of hydrocarbons.

Document U.S. Pat. No. 6,958,310 discloses a steam reforming method and catalyst containing an alumina layer, an exposed metal on the catalyst surface, and a spinel layer disposed between the alumina layer and the metal. More specifically, the catalyst comprises in a porous structure an interfacial spinel layer that contains rhodium, iridium, palladium, platinum, ruthenium, group IVB carbide and/or combinations thereof disposed in the second surface area of the pore.

Thus, the need to develop potassium-free steam reforming catalysts with high activity and resistance to coke accumulation becomes evident. The solution adopted in the present invention is the use of a catalyst consisting of nickel, lanthanum and cerium oxides on a refractory support and containing copper as a promoter. The catalyst thus prepared combines a high steam reforming activity with high resistance to coke build-up and without the need to use potassium or other alkaline elements in the catalyst formulation.

In a second objective of the present invention, a process for the production of catalysts of the Ni/support type is taught, which may contain copper and rare earths as promoters for use in the steam reforming reaction of hydrocarbons, selected from natural gas, propane, butane or naphtha that allows the placement of the active phase close to the outer surface of the support particle, preferably in a layer less than 1 mm thick, more preferably less than 0.5 mm. Such catalysts, where the active layer is found in a thin outer layer covering the support particles, are generically called eggshell.

The catalysts of the present invention can be used in $H_2$ production units with the potential to be able to reduce excess steam in the process to values lower than those allowed with the use of commercial catalysts. More active and more robust catalysts than those commercially available allow greater operational reliability and reduced operating costs, as a shutdown of a hydrogen generation unit can generate significant losses due to the subsequent shutdown of the hydrotreatment units.

More resistant, more active and robust catalysts such as those of the present invention contribute to reducing the risk of the appearance of high temperature regions in the wall of the reformer tubes in the hydrogen production process. Such high temperature regions tend to reduce the life of the tubes and bring a risk of unscheduled shutdowns of the unit to replace catalysts and/or reformer tubes, in addition to risks to people and equipment in emergency shutdown situations. In addition, more active steam reforming catalysts provide a reduction in the fuel used in the $H_2$ production process, with a consequent reduction in $CO_2$ emissions estimated in the conventional technique.

BRIEF DESCRIPTION OF THE INVENTION

The present invention refers to processes for obtaining steam reforming catalysts containing nickel, cerium, lanthanum and copper oxides, free from potassium or alkali metals, preferably with the oxide layer being located externally with a thickness of less than 0.5 mm on the support particle, preferably the support being based on alumina, magnesium aluminate, hexaaluminates or mixtures thereof. The catalysts obtained show high activity, resistance to thermal deactivation and resistance to coke accumulation in the steam reforming reaction of hydrocarbons.

The present invention further discloses a process using said catalysts for the production of hydrogen or synthesis gas by steam reforming hydrocarbons, selected from natural gas, propane, butane, naphtha or mixtures thereof, with a steam/carbon ratio of between 1 at 5 mol/mol, preferably between 2.5 to 3.5 mol/mol, temperatures between 450° C. to 950° C., preferably between 550° C. and 930° C. and pressures between 10 kgf/cm$^2$ to 50 kgf/cm$^2$, preferably between 20 kgf/cm$^2$ to 40 kgf/cm$^2$.

BRIEF DESCRIPTION OF THE DRAWINGS

The present invention will be described in more detail below, with reference to the attached figures which, in a schematic and non-limiting way, represent examples of the configuration thereof. In the drawings, there are.

DETAILED DESCRIPTION OF THE INVENTION

Figure 1:
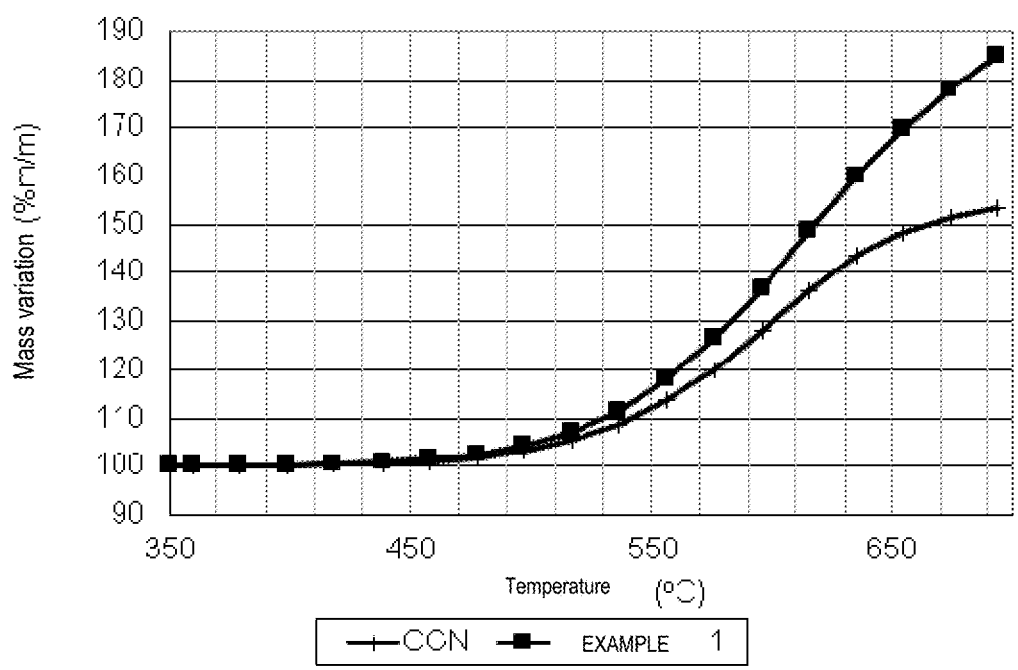
FIG. 1 illustrating a comparison of resistance to coke deposition between a commercial catalyst for steam reforming of natural gas, propane and butane (CGN) and the same catalyst promoted with 1% w/w CuO (EXAMPLE 1). This figure shows how the mere addition of CuO to a commercial catalyst does not bring the benefits of increased build-up resistance and coke.

The present invention discloses catalysts for the production of hydrogen or hydrogen-rich gases by the steam reforming of hydrocarbons, provided with high resistance to coke accumulation, high activity and resistance to deactivation by sintering of the active phase, characterized by comprising a mixture of copper, nickel, lanthanum and cerium oxides on an inorganic oxide support selected from theta-alumina, magnesium aluminate, hexaaluminates or a mixture thereof having a surface area above 15 m$^2$/g, preferably above 60 m$^2$/g.

The mixture of oxides used comprises copper, nickel, lanthanum and cerium oxides, and the nickel content expressed as nickel oxide (NiO) is between 5 and 25% w/w; the copper content expressed as copper oxide (CuO) between 0.5 to 5% w/w. The meaning of "expressed as" in the present invention is used for the purpose of determining the composition, and in practice the nickel or copper species can assume other chemical structures on the catalyst. The Ni/(La+Ce) atomic ratio is between 3 to 5 and the Ce/Al ratio between 1 to 4.

The process for obtaining the catalyst according to the present invention for the production of a mixture of gases rich in hydrogen and carbon monoxide, in the preferred embodiment, comprises the following steps:
  a) preparing a solution in a polar solvent, preferably water, of a nickel salt, preferably nickel nitrate, acetate or carbonate together with copper, lanthanum and cerium salts, preferably in the form of nitrates;
  b) impregnate the solution containing the nickel, copper, cerium and lanthanum salts in an inorganic oxide support selected from theta-alumina, magnesium aluminate or hexaaluminates, by means of the wet spot technique or by placing the said support of inorganic oxide in an excess of solution;
  c) drying the impregnated material in air, at a temperature comprised between 50° C. and 150° C., and for a time interval comprised in a range of values between 1 and 24 hours, and then calcining the impregnated material in air at a temperature comprised between 250° C. and 650° C., and for a time interval comprised in a range of values between 1 and 4 hours;

Optionally, steps a), b) and c) of the above process can be repeated more than once until the desired NiO content in the inorganic oxide support is reached.

In a second embodiment, the catalyst according to the present invention can be prepared by adding copper as a promoter in a step subsequent to the addition of nickel, cerium and lanthanum in the formulation. The process for obtaining the catalyst according to the present invention in this embodiment comprises the following steps:
  a) preparing a solution in a polar solvent, preferably water, of a nickel salt, preferably nickel nitrate, acetate or carbonate together with lanthanum and cerium salts, preferably in the form of nitrates;
  b) impregnate the solution containing the nickel, cerium and lanthanum salts in an inorganic oxide support selected from theta-alumina, magnesium aluminate or hexaaluminates, by means of the wet spot technique or by placing the said support of inorganic oxide in an excess of solution;
  c) drying the impregnated material in air, at a temperature comprised between 50° C. and 150° C., and for a time interval comprised in a range of values between 1 and 24 hours, and then calcining the impregnated material in air at a temperature comprised between 250° C. and 650° C., and for a time interval comprised in a range of values between 1 and 4 hours;
  d) preparing a solution in a polar solvent, preferably water, of an inorganic copper salt, preferably in the form of nitrate;
  e) impregnate the material consisting of the inorganic oxide support and nickel, cerium and lanthanum oxides with the solution containing the copper salt by means of the wet spot technique or by placing said inorganic oxide support in an excess of solution;
  f) drying the impregnated material in air, at a temperature comprised between 50° C. and 150° C., and for a time interval comprised in a range of values between 1 and 24 hours, and then calcining the impregnated material in air at a temperature comprised between 250° C. and 650° C., and for a time interval comprised in a range of values between 1 and 4 hours;

In a third embodiment, the catalyst according to the present invention can be prepared depositing nickel, copper, lanthanum and cerium oxides on the outside of the support particles in a layer with a maximum thickness of 1 mm, preferably less than 0.5 mm on the support particles, featuring an eggshell type of catalyst. The process for obtaining the catalyst according to the present invention in this embodiment comprises the following steps:
  a) impregnating the inorganic oxide support, selected from theta-alumina, magnesium aluminate or hexaaluminates with a glycerine and water solution;
  b) drying the inorganic support at temperatures between 50° C. and 150° C. to remove the water;
  c) impregnating the support with the pores partially occupied by glycerin with an aqueous solution of soluble salts of nickel, copper, lanthanum and cerium, preferably using the wet spot technique;
  d) drying the inorganic oxide support at 50° C. to 150° C. for 1 to 4 hours and then calcining in air at 350° C. to 650° C. for 1 to 4 hours to obtain a layer of nickel, copper, lanthanum and cerium oxides, located on the external surface of the support particles and with a penetration depth in these particles of less than 1 mm, preferably less than 0.5 mm;

Optionally, the above steps can be repeated until the desired nickel oxide content is obtained.

The catalysts thus prepared are in the oxidized state and must be activated by reduction to obtain the active phase of metallic nickel promoted by metallic copper and lanthanum and cerium oxides. The reduction is typically carried out at the industrial unit by passing a reducing gas, selected from hydrogen or gases rich in hydrogen, ammonia, methanol or natural gas, free from sulfur, in the presence of steam, with a molar ratio steam/$H_2$ or steam/carbon between 6 to 8 at temperatures in the order of 550° C. at the inlet of the reformer tubes to 850° C. at the outlet of these tubes, for periods comprised between 4 to 10 hours.

Alternatively, the catalyst can be produced in the pre-reduced state, replacing the calcination steps in the catalyst production process with a step of direct reduction in flow of a reducing agent, which can be selected from hydrogen, formaldehyde or methanol. Said direct reduction can occur at a temperature comprised in a range of values between 300° C. and 800° C., and for a period of time comprised in a range of values between 1 and 5 hours. Then, the material can be cooled and subjected to an air flow at a temperature comprised within a range of values between 20° C. and 60° C., and for a period of time comprised within a range of values between 1 and 5 hours, in order to prevent the material from having a pyrophoric feature when handled.

The inorganic oxide support is selected from the group consisting of theta-alumina, magnesium aluminate and hexaluminates or mixtures thereof. The support can be cylindrical or sphere-shaped particles containing one or multiple holes, its outer surface being smooth or preferably containing undulations to increase the outer area. The dimensions, diameter and length of the support particles are comprised between 10 and 25 cm. Preferably, the support has a surface area, measured by the nitrogen adsorption technique, above 15 $m^2/g$, preferably above 60 $m^2/g$.

The present invention further discloses a process for producing hydrogen or hydrogen-rich gases by the steam reforming reaction, using a catalyst consisting of nickel, copper, cerium and lanthanum oxides with a nickel oxide content between 5 and 25% w/w; the copper oxide content between 0.5 to 5% m/m, the Ni/(La+Ce) atomic ratio between 3 to 5 and the Ce/Al atomic ratio between 1 to 4, on an inorganic oxide support selected among theta-alumina, magnesium aluminate, hexaaluminates or mixtures thereof.

The process for the production of hydrogen or hydrogen-rich gases according to the present invention consists of contacting a stream of hydrocarbons, selected from natural gas, liquefied petroleum gas, naphtha and refinery gas or other gases containing olefins, such as those resulting from Fischer-Tropsch processes, known in the state of the art as residual gas together with water vapor and preferably hydrogen with the catalyst consisting of nickel, copper, cerium and lanthanum oxides on an inorganic oxide support. The process can be carried out at temperatures between 450° C. and 950° C., preferably between 550° C. and 930° C., pressures between 10 kgf/cm$^2$ to 50 kgf/cm$^2$, preferably between 20 kgf/cm$^2$ to 40 kgf/cm$^2$ and water vapor/carbon ratio between 1 to 5 mol/mol, preferably between 2.5 to 3.5 mol/mol. The catalyst is placed within a multiplicity of fixed bed catalytic reactors within an oven, the assembly being known in the primary reformer.

EXAMPLES

Next, for the invention to be able to be better understood, experiments are presented that illustrate the invention, without, however, being considered limiting. In these experiments, catalysts are prepared according to the state of the art process and according to the present invention, with the objective of making a comparative analysis of the coke deposition and catalytic activity indices, when the catalysts are used in a process of steam reform.

Example 1

This example illustrates the use of copper to promote a commercial NiO/support type steam reforming catalyst used for the steam reforming of natural gas, propane, and butanes.

A commercial steam reforming catalyst for light natural gas (identified as CGN) was promoted with 1% w/w of copper oxide, where 30 grams of CGN catalyst, previously ground in the particle size range below 170 mesh, were impregnated by the method of wet point with 6 ml of aqueous solution containing 0.92 grams of Cu(NO$_3$)$_2$.3H$_2$O. Then, the material was calcined at 450° C. for 4 hours to obtain a catalyst containing around 1% w/w CuO nominal. The catalyst showed a specific area of 10 m$^2$/g.

The commercial catalyst and the catalyst in accordance with EXAMPLE 1 had their steam reforming activity measured on commercial AutoChem II equipment (Micromerits). The experiments were carried out using 50 mg of catalyst ground in the range lower than 170 mesh.

Initially, a step of reduction of the nickel and copper oxide phases was carried out at a temperature of 750° C., at atmospheric pressure, for two hours, by passing 40 mL/min of a mixture containing 10% Hz/argon saturated with water vapor at 50° C. on the catalyst. Hydrogen consumption in this step was monitored by thermal conductivity. After the reduction period, the methane steam reforming reaction was carried out, passing a stream of methane (99.99%) saturated in water vapor at 90° C., which corresponds to a steam/carbon ratio of 2.3 mol/mol, at reaction temperatures of 500° C.; 550° C. and 600° C., atmospheric pressure and a space velocity (GHSV) of 96,000 h$^{-1}$ on a dry basis.

The effluent gases from the reactor were analyzed by gas chromatography and the activity measured by the degree of conversion of methane. Table 1 presents the results of the catalytic activity, measured by the degree of methane conversion at different temperatures, and shows that the addition of copper reduces the methane conversion activity in the steam reforming reaction.

TABLE 1

Comparative activity of steam reforming of methane of a commercial NiO/support type steam reforming catalyst and the same catalyst promoted by 1% w/w of CuO

| SAMPLE | Type | 500° C. | 550° C. | 600° C. |
|---|---|---|---|---|
| CGN | Commercial for natural gas, propane and butane | 22.6 | 36.5 | 49.9 |
| EXAMPLE 1 | CuO/NiO/support (commercial) | 19.5 | 36.4 | 50.0 |

Note:
Catalyst from EXAMPLE 1 containing 1% w/w copper expressed as CuO.

The commercial catalyst (CGN) and the catalyst according to EXAMPLE 1 had the resistance to coke accumulation measured in thermogravimetric analysis equipment (TGA Mettler Toledo) TGA/SDTA851E.

The tests were carried out using 25 mg of ground catalyst in a range of lower than 170 mesh. Initially, a sample reduction step was performed by passing 40 mL/min of a mixture containing 10% (v/v) of hydrogen in argon saturated with water vapor at 15° C. together with 40 mL/min of nitrogen (shielding gas) with temperature programming ranging from 100° C. to 650° C. at the rate of 10° C./min, maintained for 1 hour. Afterwards, the temperature was reduced to 350° C. and the resistance to coke deposition was measured replacing the stream of Hz/Argon with a synthetic stream consisting of 21.9% hydrogen; 13.2% CO; 15.9% CO$_2$, 43.62% CH$_4$, 1.77% nitrogen and 0.20% ethylene saturated with water vapor at 15° C. with temperature programming from 350° C. to 700° C. at the rate of 5° C./min. The results are presented in the form of percentage change in mass with the coke deposition reaction temperature, the reduced catalyst mass having been normalized to 100% before the start of the coke formation step. In this type of representation, catalysts having a higher rate of coke deposition exhibit a greater increase in the percentage of mass and/or a lower temperature at which the beginning of the increase in mass is observed, indicating the beginning of coke deposition.

As can be seen in FIG. 1, the coke deposition rate on the commercial catalyst CGN and on this commercial catalyst promoted with 1% copper oxide (EXAMPLE 1) show that there was an unwanted reduction in the resistance to carbon deposition by the addition of copper to the commercial steam reforming catalyst, according to the state of the art.

This example illustrates that commercial steam reforming catalysts, according to the state of the art, do not benefit from the addition of copper oxide to their formulation, since copper reduces the activity, as shown in Table 1, but it also reduces resistance to coke buildup.

Example 2

This example illustrates the preparation of a nickel oxide-based catalyst on a low specific area support, according to the state of the art, where 304 grams of alpha-alumina (Alcoa A2G) having specific area of 1.8 m$^2$/g were impregnated by the wet point method with 82 ml of an aqueous solution containing 61.30 grams of Ni(NO$_3$)$_2$.6H$_2$O. Then, the material was dried at 95° C. for one night and after that calcined at 450° C. for 4 hours to obtain a catalyst containing 5% NiO on alpha-alumina. The procedure was repeated two more times to obtain a catalyst containing 15% NiO supported alpha-alumina. The catalyst showed a specific area of 3.4 m$^2$/g.

Example 3

This example illustrates the preparation of a low specific area supported nickel oxide based catalyst promoted with copper, according to the state of the art. The catalyst was prepared in accordance with EXAMPLE 2 and then promoted with copper, where 99 grams of the catalyst were impregnated by the wet point method with 26.5 ml of an aqueous solution containing 3.01 grams of $Cu(NO_3)_2.3H_2O$. Then, the material was calcined at 450° C. for 4 hours to obtain a catalyst with a nominal composition of 1% CuO, 15% NiO on alpha-alumina. The catalyst showed a specific area of 2.3 $m^2/g$.

Figure 2:
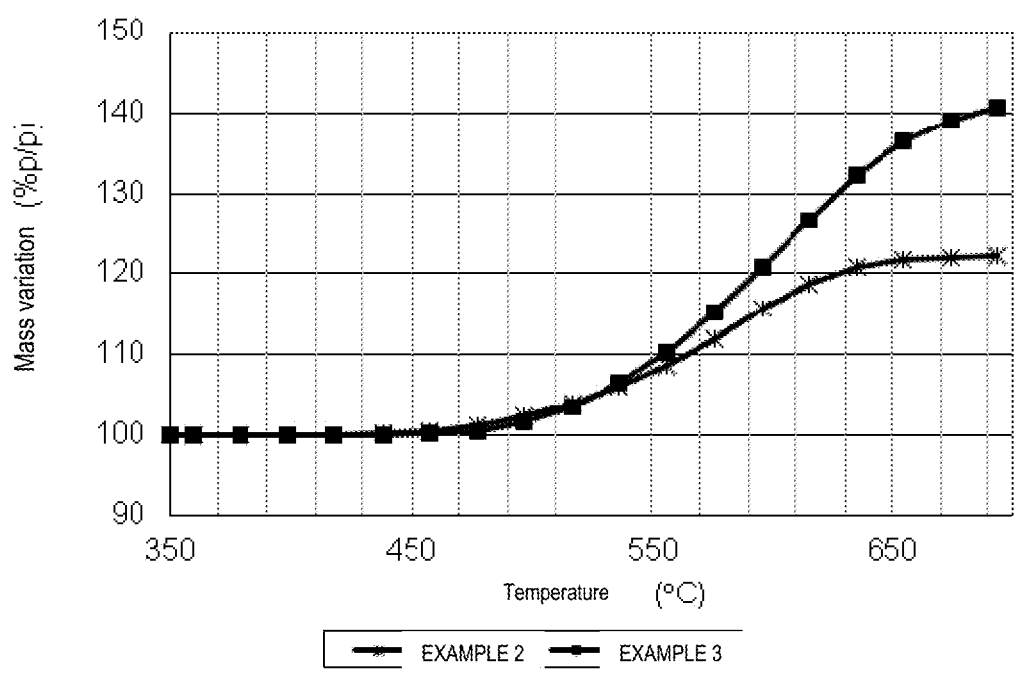
FIG. 2 illustrates a comparison of resistance to coke deposition between a catalyst prepared according to the state of the art of NiO/alpha-alumina type (EXAMPLE 2) and the same catalyst promoted with 1% w/w CuO (EXAMPLE 3). This figure shows that the addition of CuO by catalyst preparation methods in accordance with the state of the art does not bring the benefits of greater resistance to coke build-up.

Catalysts prepared according to EXAMPLES 2 and 3 had the catalytic activity and resistance to coke deposition experimentally measured as described in EXAMPLE 1. Table 2 shows that the use of copper to promote the NiO/alpha-alumina type catalyst reduces its activity while FIG. 2 shows that there was a deterioration in the resistance to coke deposition by the addition of copper oxide as a promoter to the catalyst. This example illustrates that NiO/alpha-alumina type catalysts, according to the state of the art, are not benefited by the addition of copper oxide to their formulation.

TABLE 2

Comparative activity of steam reforming of methane of NiO/alpha-alumina catalysts and the same catalyst promoted with copper oxide.

| SAMPLE | Type | 500° C. | 550° C. | 600° C. |
|---|---|---|---|---|
| EXAMPLE 2 | NiO/alpha-alumina | 35.7 | 47.5 | 57.4 |
| EXAMPLE 3 | CuO/NiO/alpha-alumina | 26.2 | 41.1 | 54.1 |

Note:
Catalyst from EXAMPLE 3 containing 1% copper expressed as CuO.

Example 4

This example illustrates the preparation of a catalyst based on nickel, lanthanum and cerium oxides on a theta-alumina type support, where 100 grams of theta-alumina (SPH 508F from Axens, with pore volume of 0.7 $cm^3/g$ in the shape of spheres of 3 mm to 4 mm in diameter, specific area of 85.5 $m^2/g$ determined by the N2 adsorption technique) were impregnated by the wet point method with 70 ml of aqueous solution containing 2.95 grams of $La(NO_3)_3.6H_2O$, 8.82 grams of $Ce(NO_3)_3.3H_2O$ and 33.03 grams of $Ni(NO_3)_2.6H_2O$. Then, the material was dried at 60° C. for 2 hours, heated in static air from 60° C. to 120° C. at the rate of 1° C./min, and then up to 250° C. at the rate of 1.4° C./min. The following material was calcined at 450° C. for 4.5 hours to obtain a Ni—Ce—La-theta-alumina type catalyst containing 7.6% (w/w) of NiO, 1.0% (w/w) of $La_2O_3$ and 3,0% w/w of $Ce_2O_3$. The catalyst had a specific area of 83.7 $n^2/g$ determined by the technique of adsorption of N2 in commercial equipment (Micromerits).

Example 5

This example illustrates the preparation of a catalyst according to the present invention based on copper, nickel, lanthanum and cerium oxides on a supported theta-alumina type.

The addition of copper oxide as a promoter was carried out with 100 grams of the catalyst prepared in accordance with EXAMPLE 4, impregnated by the wet point method with 65 mol of an aqueous solution containing 2.98 grams of $Cu(NO_3)_2.3H_2O$. Then, the material was dried at 95° C. for one night and calcined at 450° C. for 4 hours to obtain a catalyst of the Cu—Ni—Ce—La-theta-alumina type with nominal content of 1.0% (w/w) of CuO 7.5% (w/w) of NiO, 1.0% (w/w) of $La_2O_3$ and 3.0% w/w of $Ce_2O_3$ which after activation had the copper and nickel oxide phases reduced to copper and nickel metals. The catalyst showed a specific area of 76 $m^2/g$.

Example 6

This example illustrates the preparation of a catalyst according to the present invention based on copper, nickel, lanthanum and cerium oxides on a supported theta-alumina type. The catalyst was prepared according to EXAMPLE 4 and then promoted with copper.

The addition of copper as a promoter was carried out with 100 grams of the catalyst prepared according to EXAMPLE 4 impregnated by the wet point method with an aqueous solution containing 15.54 grams of $Cu(NO_3)_2.3H_2O$ to obtain a Cu—Ni—Ce—La-theta-alumina type catalyst with nominal composition of 5.0% (w/w) of CuO 7.2% (w/w) of NiO, 0.9% (w/w) of $La_2O_3$ and 2.9% w/w of $Ce_2O_3$. The catalyst had a specific area determined by the N2 adsorption technique of 60 $m^2/g$.

Catalysts prepared according to EXAMPLES 4, 5 and 6 had the catalytic activity and resistance to coke deposition experimentally measured as described in EXAMPLE 1. For comparison, two commercial nickel oxide steam reforming catalysts containing potassium, supported on refractory materials used for heavy natural gas (CGNP) and for naphtha (CNF), containing medium and high potassium content, respectively, were included. The results in Table 3 show that the catalysts prepared according to the present invention have high steam reforming activity, superior to commercial catalysts according to the state of the art.

Figure 3:
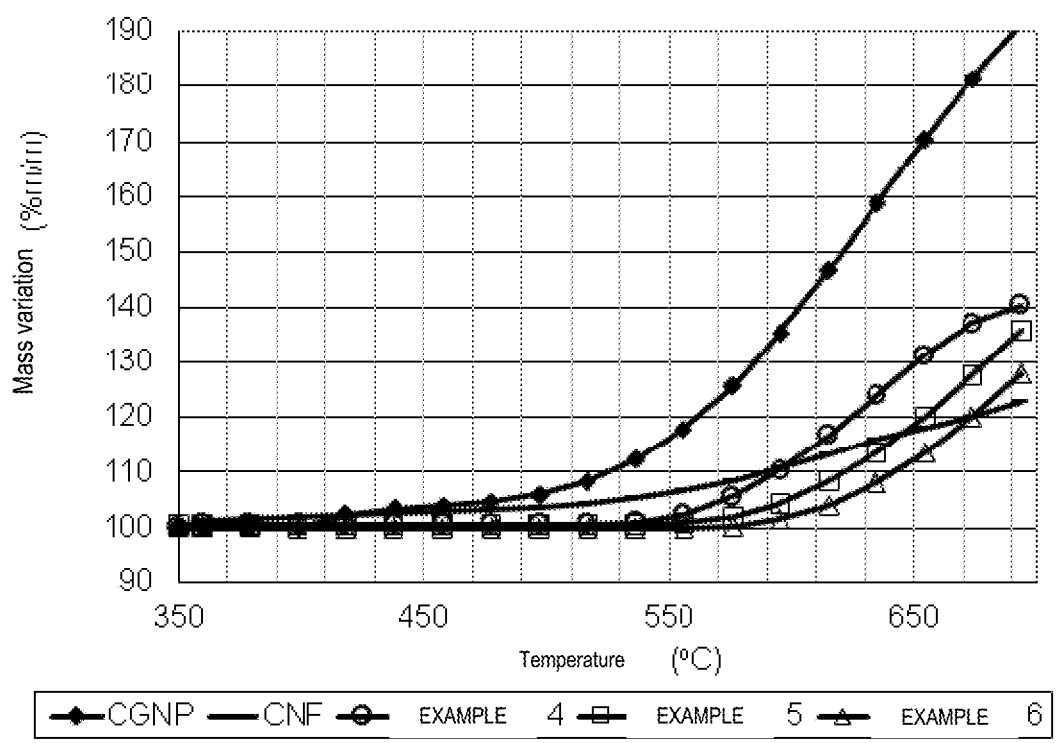
FIG. 3 illustrating a comparison of resistance to coke deposition between commercial heavy natural gas (CGNP) and naphtha (CNF) steam reforming catalysts and catalysts in accordance with the present invention containing 1% w/w CuO (EXAMPLE 5) and 5% w/w CuO (EXAMPLE 6). This figure illustrates that catalysts prepared in accordance with the present invention have greater resistance to coke accumulation than materials in accordance with the state of the art.

FIG. 3 shows that surprisingly, the addition of copper oxide to the catalyst formulation increases resistance to coke build-up, unlike what was observed for state of the art catalysts as illustrated in FIGS. 1 and 2, where the addition of copper oxide to catalyst formulation reduces resistance to coke buildup. The catalysts according to the present invention have high steam reforming activity and resistance to coke deposition, therefore, they are suitable for industrial use, without presenting the disadvantages of using alkali metals, such as potassium, of the catalysts obtained according to the state of the art.

Copper added to the catalyst according to the present invention makes it possible to increase the resistance to the build-up of coke. It is believed that this unexpected effect, considering that the addition of copper reduces the resistance to the build-up of coke when added to a state-of-the-art catalyst formulation, is due to the combination of the catalyst composition, containing lanthanum and cerium oxides, with the use of a support having high surface area, selected among theta-alumina, magnesium aluminates and hexaaluminates.

TABLE 3

Comparative methane steam reforming activity of catalysts according to the present invention and commercial catalysts according to the state of the art.

| SAMPLE | Type | 500° C. | 550° C. | 600° C. |
|---|---|---|---|---|
| CGNP | Commercial for heavy natural gas | 22.0 | 43.4 | 55.0 |
| CNF | Commercial for naphtha | 27.6 | 37.4 | 47.4 |
| EXAMPLE 4 | NiO—$Ce_2O_3$—$La_2O_3$/theta-alumina | 41.8 | 47.3 | 56.2 |
| EXAMPLE 5 | CuO/NiO—$Ce_2O_3$—$La_2O_3$/theta-alumina | 35.8 | 47.2 | 55.9 |
| EXAMPLE 6 | CuO/NiO—$Ce_2O_3$—$La_2O_3$/theta-alumina | 36.5 | 46.7 | 55.7 |

Note:
Catalyst of EXAMPLES 5 and 6 containing 1% copper and 5% copper, respectively, expressed as CuO. Commercial catalysts of type K/NiO/support for heavy natural gas (CGNP) and for naphtha (CNF).

Example 7

This example illustrates the preparation of a catalyst according to the present invention based on copper, nickel, lanthanum and cerium oxides on a support of the alumina type, with copper being added simultaneously with the other elements, where 100 grams of theta-alumina (SPH 508F from Axens, with pore volume of 0.7 cm$^3$/g in the shape of spheres from 3 mm to 4 mm in diameter, specific area of 85.5 m$^2$/g determined by the N2 adsorption technique) were impregnated with 70 ml of aqueous solution containing 2.96 grams of La(NO$_3$)$_3$.6H$_2$O, 8.82 grams of Ce(NO$_3$)$_3$.3H$_2$O, 33.34 grams of Ni(NO$_3$)$_2$.6H$_2$O and 2.70 grams of Cu(NO$_3$)$_2$.3H$_2$O by the wet spot technique. Then, the material was dried at 60° C. for 2 hours, heated in static air from 60° C. to 120° C. at the rate of 1° C./min, and then up to 250° C. at the rate of 1.4° C./min. Then the material was calcined at 450° C. for 4.5 hours to obtain a Cu—Ni—Ce—La-theta-alumina catalyst containing nominal content of 7.6% (w/w) of NiO, 1.0% (w/w) of La$_2$O$_3$, 3.0% w/w of Ce$_2$O$_3$ and 1.0% of CuO. The catalyst showed a specific area of 61.6 m$^2$/g determined by the technique of N2 adsorption in commercial equipment (Micromerits).

Figure 4:
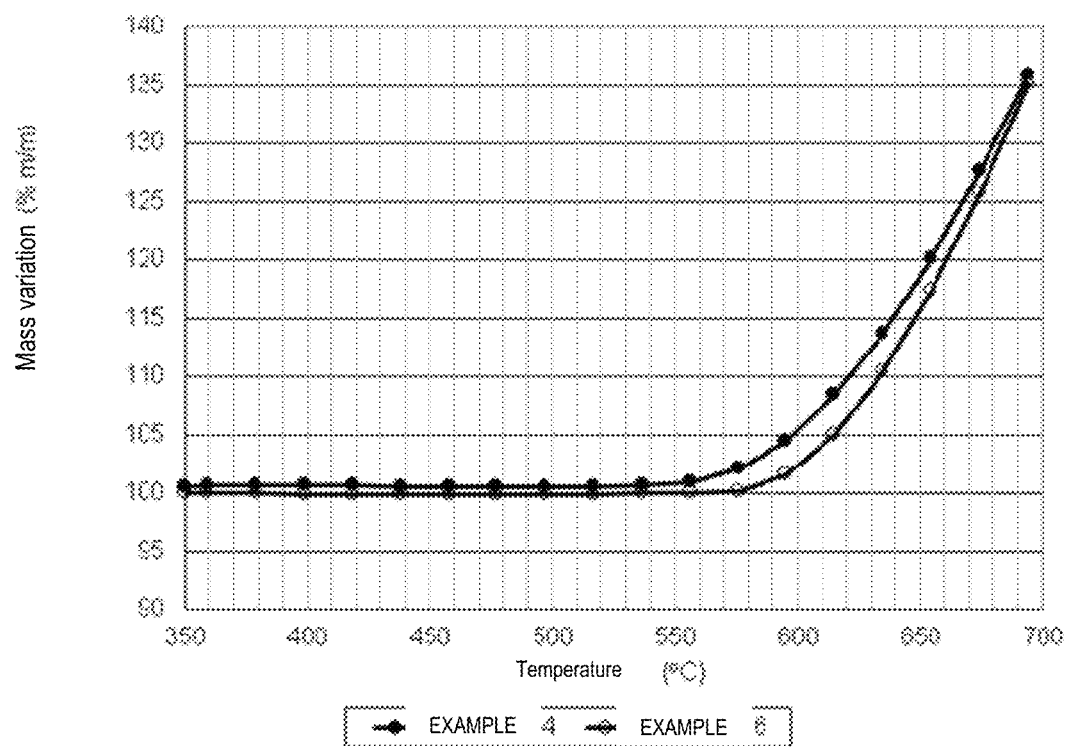
FIG. 4 illustrating a comparison of resistance to coke deposition between catalysts prepared in accordance with the present invention, containing 1% w/w CuO, prepared by the impregnation process in steps (EXAMPLE 4) and by the preferred embodiment of simultaneous impregnation (EXAMPLE 6). The figure illustrates why the simultaneous impregnation embodiment is preferred, as it simplifies the catalyst preparation process and allows for better performance.

The catalysts prepared in accordance with the present invention in the embodiment of sequential (EXAMPLE 5) and simultaneous (EXAMPLE 7) impregnation had the catalytic activity and resistance to coke deposition experimentally measured as described in EXAMPLE 1. The results show that the catalysts according to the present invention, in the preferred embodiment of a preparation process by simultaneous impregnation with copper, nickel, lanthanum and cerium salts, which allows to simplify the catalyst production process with a consequent reduction of costs, allow to obtain higher activity values, as shown in the Table 4 associated and a greater resistance to coke build-up, as shown in FIG. 4.

TABLE 4

Comparative activity of steam reforming methane of catalysts in accordance with the present invention by the step process (EXAMPLE 5) and by the preferred embodiment of simultaneous impregnation (EXAMPLE 7).

| SAMPLE | Type | 500° C. | 550° C. | 600° C. |
|---|---|---|---|---|
| EXAMPLE 5 | CuO/NiO—$Ce_2O_3$—$La_2O_3$/theta-alumina (steps) | 35.8 | 47.2 | 55.9 |
| EXAMPLE 7 | CuO—NiO—/$Ce_2O_3$—$La_2O_3$ theta-alumina (simultaneous) | 40.7 | 50.1 | 59.8 |

Note:
Catalysts containing 1% copper expressed as CuO.

Example 8

This example illustrates the preparation of a catalyst according to the present invention based on copper, nickel, lanthanum and cerium oxides on a support of the magnesium aluminate type, with copper being added simultaneously with the other elements and the copper oxide and oxide of the elements forming a surface layer on the support with a small penetration depth, featuring an eggshell type of catalyst.

Figure 5:
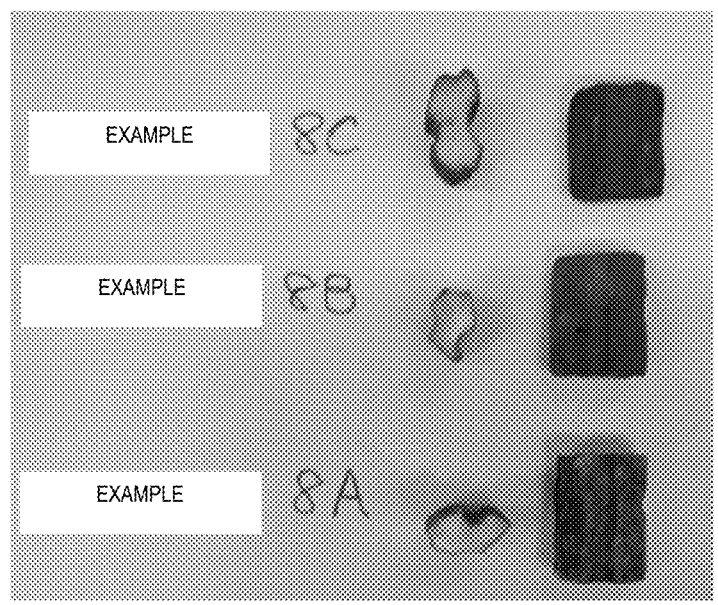
FIG. 5 illustrating an external and internal aspect of catalyst particles prepared in accordance with the present invention containing copper, nickel, lanthanum and cerium oxides prepared by the eggshell process on a magnesium aluminate type support (EXAMPLE 8). The darkest region in the particles indicates the presence of nickel and/or copper oxide.

The catalyst was prepared with 100 grams of a magnesium aluminate type support (DYTECH, Ceraguard 1616, with dimensions 16×16×7 mm, in the shape of a ring with 6 holes) which were broken into smaller pieces and then immersed in a solution of 80% w/w of glycerin in water at room temperature for 10 minutes. After being separated from the solution, they were kept at 70° C. for 2 hours to remove the aqueous phase, leaving 80% of the pore volume of the support occupied with glycerin. The pellets were then impregnated by the wet spot technique with an aliquot of 6.38 ml of an aqueous solution containing 5.16 grams of copper nitrate (Cu(NO$_3$)$_2$.3H$_2$O), 40 grams of nickel nitrate (Ni(NO$_3$).$_2$.6H$_2$O), 3.56 grams of lanthanum nitrate (La(NO$_3$)$_3$.6H$_2$O) and 10.72 grams of cerium nitrate (Ce(NO$_3$)$_3$.6H$_2$O) in 80 ml of water. The material was then dried at 70° C. for 2 hours and calcined at 400° C. for 2 hours to obtain the catalyst containing oxides of the elements of copper, nickel, lanthanum and cerium on the surface of the pellets, as shown in FIG. 5. The procedure of impregnating with the aqueous solution of glycerin, drying and calcinating followed by the impregnation with the solution of copper, nickel, lanthanum and cerium elements, followed by drying and calcinating was repeated twice more to obtain the catalysts identified in the different steps as EXAMPLE 8A, 8B and 8C, respectively.

The catalysts had the methane steam reforming catalytic activity measured experimentally as described in EXAMPLE 1. For the coke build-up resistance test, the catalyst was initially activated by reduction in a flow of hydrogen at 700° C. for 1 hour and then exposed at a temperature of 600° C. for 15 minutes to a stream of methane saturated in water vapor maintained at 10° C. for coke deposition. The reactor temperature was then reduced to 350° C. in nitrogen flow. Upon reaching 350° C., the nitrogen flow was replaced with synthetic air and a temperature program from 350° C. to 650° C. was started at a rate of 10° C./min to remove the coke. The release of CO$_2$, indicating coke removal, was monitored by mass spectrometry.

Table 5 shows that the catalyst activity was dependent on the number of impregnation steps, and therefore it can be easily adjusted to the maximum value, thus being suitable for use in industrial practice.

Figure 6:
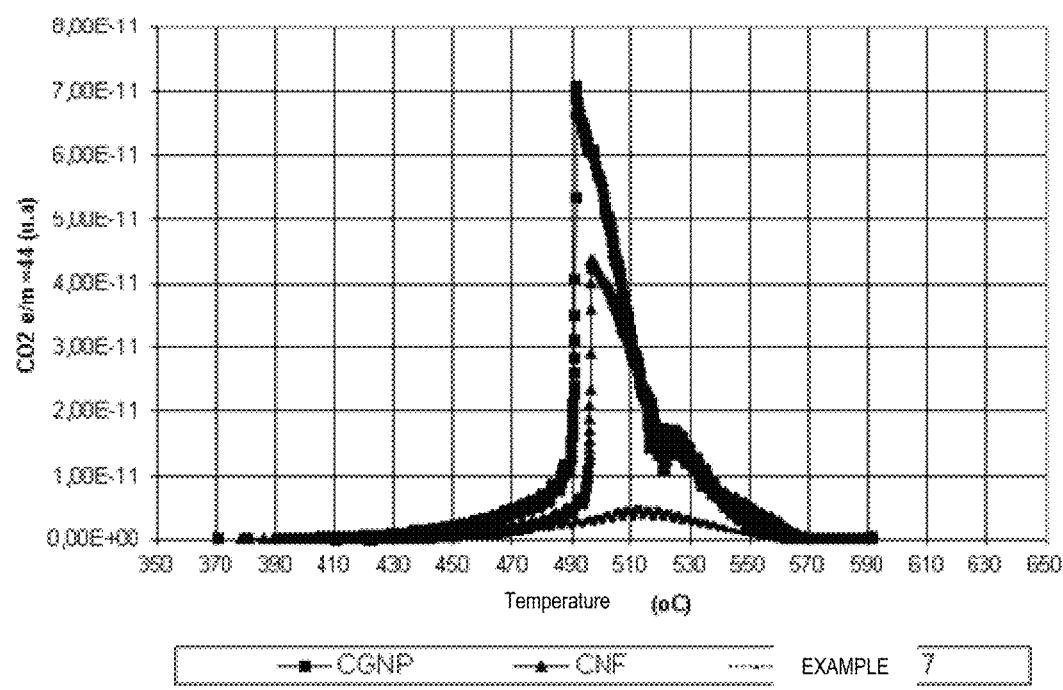
FIG. 6 illustrating a comparison between the coke build-up resistance of commercial heavy natural gas (CGNP) and naphtha (CNF) steam reforming catalysts with a catalyst prepared in accordance with the present invention containing oxides of copper, nickel, Lanthanum and cerium prepared by the eggshell process on a magnesium aluminate type support (EXAMPLE 8C).

The catalysts still showed activity similar to that observed with commercial catalysts according to the state of the art (Table 3), but with the advantage of using a lower content of metals and promoters in their formulation. Under the conditions of the coking resistance experiments, the sample prepared in accordance with the present invention (EXAMPLE 8C) did not show a significant accumulation of coke, as commercial catalysts, according to the state of the art, used for the steam reforming of heavy natural gas (CGNP) and naphtha (CNF) had a high release of $CO_2$, indicating a high coke content as illustrated in FIG. 6.

TABLE 5

Methane steam reforming activity of catalysts according to the present invention in eggshell embodiment.

| SAMPLE | Type | 500° C. | 550° C. | 600° C. |
|---|---|---|---|---|
| EXAMPLE 8A | CuO—NiO—$Ce_2O_3$—$La_2O_3$/ magnesium aluminate (one impregnation step) | 17.2 | 23.9 | 30.8 |
| EXAMPLE 8B | CuO—NiO—$Ce_2O_3$—$La_2O_3$/ magnesium aluminate (two impregnation steps) | 26.0 | 35.2 | 42.7 |
| EXAMPLE 8C | CuO—NiO—$Ce_2O_3$—$La_2O_3$/ magnesium aluminate (three impregnation steps) | 22.9 | 32.1 | 41.4 |

Example 9

This example illustrates the additional surprising advantage, in addition to allowing for greater activity and greater resistance to coke buildup, of the use of copper oxide in the catalyst formulation in accordance with the present invention in increasing resistance to thermal deactivation (sintering).

After measuring the steam reforming activity of the catalysts of EXAMPLES 4 and 5, as described in EXAMPLE 1, an accelerated deactivation step was carried out at high temperatures, simulating the aging of the catalyst in the industrial process, by exposing the catalyst in flow of Hz/water vapor at a temperature of 900° C. for 6 hours. After this period, the conditions described in EXAMPLE 1 were returned and the steam reforming activity was measured again. The results are shown in Table 6 and show that surprisingly the presence of copper also contributes to increase the resistance to thermal deactivation of the catalysts according to the present invention.

TABLE 6

Initial methane steam reforming activity and after deactivation period at 900° C. for 6 hours in $H_2$/ steam flow. Methane conversion values determined at a temperature of 550° C.

| Sample | Type | Initial steam reforming activity | Steam reforming activity after thermal deactivation |
|---|---|---|---|
| EXAMPLE 4 | NiO—$Ce_2O_3$—$La_2O_3$/theta-alumina | 47.3 | 19.1 |
| EXAMPLE 5 | CuO/NiO—$Ce_2O_3$—$La_2O_3$/theta-alumina | 47.2 | 35.5 |

It should be noted that, although the present invention has been described with respect to the attached drawings, modifications and adaptations can be made by those skilled in the art, depending on the specific situation, but provided that it is within the inventive scope defined herein.

The invention claimed is:

1. A steam reforming catalyst comprising:
   a) an inorganic oxide support selected from theta-alumina, magnesium aluminate, hexaaluminates, or a mixture thereof, having a surface area above 15 $m^2/g$; and
   b) a mixture of nickel, copper, lanthanum, and cerium oxides, with the total nickel content, expressed as nickel oxide (NiO) between 5 and 25% w/w; the copper content expressed as copper oxide (CuO) between 0.5 to 5% w/w, a Ni/(La+Ce) atomic ratio between 3 to 5 and a Ce/Al atomic ratio between 1 to 4;
   wherein the inorganic oxide support comprises cylindrical or sphere-shaped particles.

2. The steam reforming catalyst according to claim 1, wherein the inorganic oxide support has a surface area above 60 $m^2/g$.

3. A process for obtaining the steam reforming catalyst of claim 1, comprising the following steps:
   a) preparing a solution in a polar solvent, of a nickel salt, in the form of nickel nitrate, acetate or carbonate together with copper, lanthanum, and cerium salts in the form of nitrates;
   b) impregnating the solution containing the nickel, copper, cerium, and lanthanum salts in an inorganic oxide support selected from theta-alumina, magnesium aluminate, hexaaluminates, or a mixture thereof, by means of the wet spot technique or by placing the support of inorganic oxide in an excess of solution to form an impregnated material; and
   c) drying the impregnated material in air, at a temperature ranging between 50° C. and 150° C., and for a time interval in a range of values between 1 and 24 hours, and then calcining the impregnated material in air at a temperature ranging between 250° C. and 650° C., and for a time interval in a range of values between 1 and 4 hours.

4. The process for obtaining the steam reforming catalyst according to claim 3, wherein the polar solvent is water.

5. The process for obtaining the steam reforming catalyst according to claim 3, wherein the final calcination step is replaced with a direct reduction comprising the following steps:
   a) contacting the steam reforming catalyst with a flow of a reducing agent, selected from hydrogen, formaldehyde, methanol, or natural gas in the presence of water vapor at a temperature ranging from 300° C. to 800° C. and for a time interval in a range of values between 1 to 5 hours; and
   b) cooling in a flow of $N_2$ and subjecting the reduced catalyst to an air flow at a temperature in a range of values between 20° C. to 100° C., and for a time interval in a range of values between 1 to 5 hours.

6. A process for obtaining the steam reforming catalyst of claim 1, comprising the following steps:
   a) preparing a solution in a polar solvent, of a nickel inorganic salt, in the form of nickel nitrate, acetate, or carbonate together with lanthanum and cerium salts in the form of nitrates;
   b) impregnating the solution containing the nickel, cerium, and lanthanum salts in an inorganic oxide support selected from theta-alumina, magnesium aluminate, or hexaaluminates, by means of the wet spot technique or by placing the support of inorganic oxide in an excess of solution to form an impregnated material;

c) drying the impregnated material in air, at a temperature ranging between 50° C. and 150° C., and for a time interval in a range of values between 1 and 24 hours, and then calcining the impregnated material in air at a temperature ranging between 250° C. and 650° C., and for a time interval in a range of values between 1 and 4 hours;

d) preparing a solution in a polar solvent, of an inorganic copper salt, in the form of nitrate;

e) impregnating the material consisting of the inorganic oxide support and nickel, cerium, and lanthanum oxides with the solution containing the copper salt by means of the wet spot technique or by placing the inorganic oxide support in an excess of solution; and f) drying the impregnated material in air, at a temperature ranging between 50° C. and 150° C., and for a time interval in a range of values between 1 and 24 hours, and then calcining the impregnated material in air at a temperature ranging between 250° C. and 650° C., and for a time interval in a range of values between 1 and 4 hours.

7. The process for obtaining the steam reforming catalyst according to claim 6, wherein the polar solvent is water.

8. The process for obtaining the steam reforming catalyst according to claim 6, wherein the final calcination step is replaced with a direct reduction comprising the following steps:
  a) contacting the steam reforming catalyst with a flow of a reducing agent, selected from hydrogen, formaldehyde, methanol, or natural gas in the presence of water vapor at a temperature ranging from 300° C. to 800° C. and for a time interval in a range of values between 1 to 5 hours; and
  b) cooling in a flow of $N_2$ and subjecting the reduced catalyst to an air flow at a temperature in a range of values between 20° C. to 100° C., and for a time interval in a range of values between 1 to 5 hours.

9. A process of steam reforming of hydrocarbon streams comprising conducting the hydrocarbon stream with the steam reforming catalyst of claim 1, carried out in the presence of water vapor and hydrogen, temperatures ranging between 450° C. to 950° C., pressures between 10 kgf/cm² to 50 kgf/cm² and water vapor/carbon ratio between 1 to 5 mol/mol.

10. The process of steam reforming of hydrocarbon streams according to claim 9, wherein the temperature ranges between 550° C. to 930° C., pressures between 20 kgf/cm² to 40 kgf/cm² and water vapor/carbon ratio between 2.5 to 3.5 mol/mol.

11. The process of steam reforming of hydrocarbon streams according to claim 9, wherein the hydrocarbon stream comprises natural gas, liquefied petroleum gas, naphtha, or gases containing olefins.

12. A steam reforming catalyst comprising:
  a) an inorganic oxide support selected from theta-alumina, magnesium aluminate, hexaaluminates, or a mixture thereof, having a surface area above 15 m²/g; and
  b) a mixture of nickel, copper, lanthanum, and cerium oxides, with the total nickel content, expressed as nickel oxide (NiO) deposited on the outside of the support particles at a depth equal to or less than 1 mm, with the content nickel oxide in this layer ranging between 5 and 25% w/w; the copper content expressed as copper oxide (CuO) between 0.5 to 5% w/w, a Ni/(La+Ce) atomic ratio ranging between 3 to 5 and a Ce/Al atomic ratio ranging between 1 to 4;
  wherein the inorganic oxide support comprises cylindrical or sphere-shaped particles.

13. The steam reforming catalyst according to claim 12, wherein the inorganic oxide support has a surface area above 60 m²/g.

14. The steam reforming catalyst according to claim 12, wherein the mixture of nickel, copper, lanthanum, and cerium oxides is deposited on the outside of the support particles at a depth equal to or less than 0.5 mm.

15. A process for obtaining the steam reforming catalyst of claim 12, comprising the following steps:
  a) impregnating the inorganic oxide support, selected from theta-alumina, magnesium aluminate, or hexaaluminates with a glycerine and water solution;
  b) drying the inorganic support at a temperature ranging between 50° C. and 150° C. to remove the water;
  c) impregnating the support with the pores partially occupied by glycerin with an aqueous solution of soluble salts of nickel, copper, lanthanum, and cerium using the wet spot technique; and
  d) drying the inorganic oxide support at 50° C. to 150° C. for 1 to 4 hours and then calcining in air at 350° C. to 650° C. for 1 to 4 hours to obtain a layer of nickel, copper, lanthanum, and cerium oxides, located on the outer surface of the support particles.

16. The process for obtaining the steam reforming catalyst according to claim 15, wherein the final calcination step is replaced with a direct reduction comprising the following steps:
  a) contacting the steam reforming catalyst with a flow of a reducing agent, selected from hydrogen, formaldehyde, methanol, or natural gas in the presence of water vapor at a temperature ranging from 300° C. to 800° C. and for a time interval in a range of values between 1 to 5 hours; and
  b) cooling in a flow of $N_2$ and subjecting the reduced catalyst to an air flow at a temperature in a range of values between 20° C. to 100° C., and for a time interval in a range of values between 1 to 5 hours.

17. A process of steam reforming of hydrocarbon streams comprising conducting the hydrocarbon stream with the steam reforming catalyst of claim 7, carried out in the presence of water vapor and hydrogen, temperatures ranging between 450° C. to 950° C., pressures between 10 kgf/cm² to 50 kgf/cm² and water vapor/carbon ratio between 1 to 5 mol/mol.

18. The process of steam reforming of hydrocarbon streams according to claim 17, wherein the temperature ranges between 550° C. to 930° C., pressures between 20 kgf/cm² to 40 kgf/cm² and water vapor/carbon ratio between 2.5 to 3.5 mol/mol.

19. The process of steam reforming of hydrocarbon streams according to claim 17, wherein the hydrocarbon stream comprises natural gas, liquefied petroleum gas, naphtha, or gases containing olefins.

\* \* \* \* \*